(12) United States Patent
Neilson

(10) Patent No.: US 8,672,071 B2
(45) Date of Patent: Mar. 18, 2014

(54) FLUID COOLER ARRANGEMENT FOR A COOLING PACKAGE IN A WORK VEHICLE

(75) Inventor: Ryan R. Neilson, Dubuque, IA (US)

(73) Assignee: Deere & Company, Moline, IL (US)

( * ) Notice: Subject to any disclaimer, the term of this patent is extended or adjusted under 35 U.S.C. 154(b) by 42 days.

(21) Appl. No.: 13/238,863

(22) Filed: Sep. 21, 2011

(65) Prior Publication Data

US 2013/0068546 A1    Mar. 21, 2013

(51) Int. Cl.
*B60K 11/00*    (2006.01)
(52) U.S. Cl.
USPC .......................... 180/68.1; 180/68.4
(58) Field of Classification Search
USPC ............ 180/68.1, 68.4; 165/51, 149, 77, 122, 165/41; 123/41.33, 41.43
See application file for complete search history.

(56) References Cited

U.S. PATENT DOCUMENTS

| | | | | | |
|---|---|---|---|---|---|
| 1,648,804 | A | * | 11/1927 | Griese | 180/68.4 |
| 2,253,438 | A |   | 8/1941 | Lutz | |
| 3,297,080 | A | * | 1/1967 | Williams et al. | 165/77 |
| 3,334,704 | A | * | 8/1967 | Gehrke et al. | 180/68.4 |
| 3,757,853 | A |   | 9/1973 | Daman | |
| 3,834,478 | A | * | 9/1974 | Alexander et al. | 180/68.6 |
| 4,066,119 | A | * | 1/1978 | Stedman | 165/41 |
| 4,160,487 | A |   | 7/1979 | Kunze et al. | |
| 4,287,961 | A | * | 9/1981 | Steiger | 180/68.4 |
| 4,541,645 | A |   | 9/1985 | Foeldesi | |
| 4,696,361 | A | * | 9/1987 | Clark et al. | 180/68.4 |
| 4,757,858 | A | * | 7/1988 | Miller et al. | 165/41 |
| 4,942,187 | A |   | 7/1990 | Kawata et al. | |
| 5,009,262 | A |   | 4/1991 | Halstead et al. | |
| 5,386,873 | A |   | 2/1995 | Harden, III et al. | |
| 5,492,167 | A | * | 2/1996 | Glesmann | 165/41 |
| 5,522,457 | A |   | 6/1996 | Lenz | |
| 6,105,660 | A |   | 8/2000 | Knurr | |
| 6,523,520 | B1 |   | 2/2003 | Chatterjea | |
| 6,732,784 | B2 | * | 5/2004 | Dion | 165/41 |
| 6,880,656 | B2 | * | 4/2005 | Pfusterschmid et al. | 180/68.4 |
| 6,966,355 | B2 | * | 11/2005 | Branham et al. | 165/41 |
| 7,128,178 | B1 | * | 10/2006 | Heinle et al. | 180/68.4 |
| 7,370,690 | B2 | * | 5/2008 | Rasset et al. | 165/41 |
| 7,401,672 | B2 | * | 7/2008 | Kurtz et al. | 180/68.4 |
| 7,426,909 | B2 | * | 9/2008 | Keane et al. | 123/41.29 |
| 7,455,100 | B2 | * | 11/2008 | Tallon | 165/41 |
| 7,753,152 | B2 | * | 7/2010 | Nakae et al. | 180/68.1 |
| 7,950,443 | B2 | * | 5/2011 | Rasset et al. | 165/41 |
| 8,186,751 | B2 | * | 5/2012 | Davisdon et al. | 296/193.1 |
| 8,276,650 | B2 | * | 10/2012 | Martin et al. | 165/41 |
| 2005/0211483 | A1 |   | 9/2005 | Pfohl et al. | |
| 2006/0219451 | A1 | * | 10/2006 | Schmitt | 180/68.4 |

(Continued)

FOREIGN PATENT DOCUMENTS

EP    1098073 A2    5/2001
FR    2808870 A1    11/2001

(Continued)

*Primary Examiner* — John Walters
*Assistant Examiner* — James Triggs
(74) *Attorney, Agent, or Firm* — Faegre Baker Daniels LLP

(57) ABSTRACT

A work vehicle includes a frame and a cooling package carried by the frame. The cooling package includes a housing with an opening, and a fluid cooler covering the opening. The fluid cooler includes at least one hinge along one side thereof, and at least one latch along another side thereof, whereby the fluid cooler can be pivoted open to access an inner side of the fluid cooler.

32 Claims, 4 Drawing Sheets

(56) References Cited

U.S. PATENT DOCUMENTS

| | | | |
|---|---|---|---|
| 2006/0289143 A1* | 12/2006 | Tallon | 165/41 |
| 2007/0007061 A1* | 1/2007 | Meyer et al. | 180/68.1 |
| 2008/0135209 A1* | 6/2008 | Lowe et al. | 165/77 |
| 2009/0038775 A1* | 2/2009 | Leconte | 165/67 |
| 2009/0078394 A1* | 3/2009 | Weatherup | 165/51 |

FOREIGN PATENT DOCUMENTS

| | | |
|---|---|---|
| GB | 2184700 A | 7/1987 |
| GB | 2355700 A | 5/2001 |
| JP | 09011761 A | 1/1997 |
| JP | 10266967 A | 10/1998 |
| JP | 2001012244 A | 1/2001 |
| JP | 2002030693 A | 1/2002 |
| JP | 2003146089 A | 5/2003 |
| JP | 2003159932 A | 6/2003 |
| JP | 2003193509 A | 7/2003 |
| JP | 2003291662 A | 10/2003 |
| JP | 2004278379 A | 10/2004 |
| JP | 2006183399 A | 7/2006 |
| WO | WO 2004099581 A1 | 11/2004 |

* cited by examiner

FLUID COOLER ARRANGEMENT FOR A COOLING PACKAGE IN A WORK VEHICLE

FIELD OF THE INVENTION

The present invention relates to work machines, and, more particularly, to fluid cooling systems in such work machines.

BACKGROUND OF THE INVENTION

Work vehicles, such as construction, forestry, mining and agricultural work vehicles, typically include a prime mover in the form of an internal combustion engine which powers a set of wheels or tracks. Various fluid coolers are carried onboard the work vehicle to cool different required fluids, such as engine coolant, hydraulic oil, engine exhaust, etc. Such a fluid cooler is typically in the form of a heat exchanger with an inlet and an outlet. For some work vehicles, it is known to provide a cooling package which is basically a stand-alone segregated area at which the different fluid coolers are located for convenient servicing, etc. A fan or the like may be positioned in association with the cooling package to cause air to flow over the different heat exchangers for cooling of the fluids therein. The heat exchangers may have a rib at the top and bottom which slide within tracks in the cooling package to allow the heat exchanger to be removed and cleaned.

What is needed in the art is a more convenient way of servicing fluid coolers in a cooling package, while concurrently providing access to the interior of the cooling package for servicing of other components.

SUMMARY

The present invention provides a fluid cooler used with a cooling package on a work vehicle, wherein the fluid cooler is hinged along one edge and latched along another edge, thereby allowing easy access to the inner side of the fluid cooler and interior of the cooling package.

The invention in one form is directed to a vehicle including a frame, an internal combustion engine carried by the frame, and a cooling package associated with the internal combustion engine. The cooling package includes a housing with an opening, and a fluid cooler covering the opening. The fluid cooler includes at least one hinge along one side thereof, and at least one latch along another side thereof, whereby the fluid cooler can be pivoted open to access an inner side of the fluid cooler.

The invention in another form is directed to a work vehicle, including a frame, and a cooling package carried by the frame. The cooling package includes a housing with an opening, and a fluid cooler covering the opening. The fluid cooler includes at least one hinge along one side thereof, and at least one latch along another side thereof, whereby the fluid cooler can be pivoted open to access an inner side of the fluid cooler.

The invention in yet another form is directed to a stand-alone cooling package for cooling a fluid used in a work vehicle. The cooling package includes a housing with an opening, and a fluid cooler covering the opening. The fluid cooler includes at least one hinge along one side thereof, and at least one latch along another side thereof, whereby the fluid cooler can be pivoted open to access an inner side of the fluid cooler.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION

Figure 1:
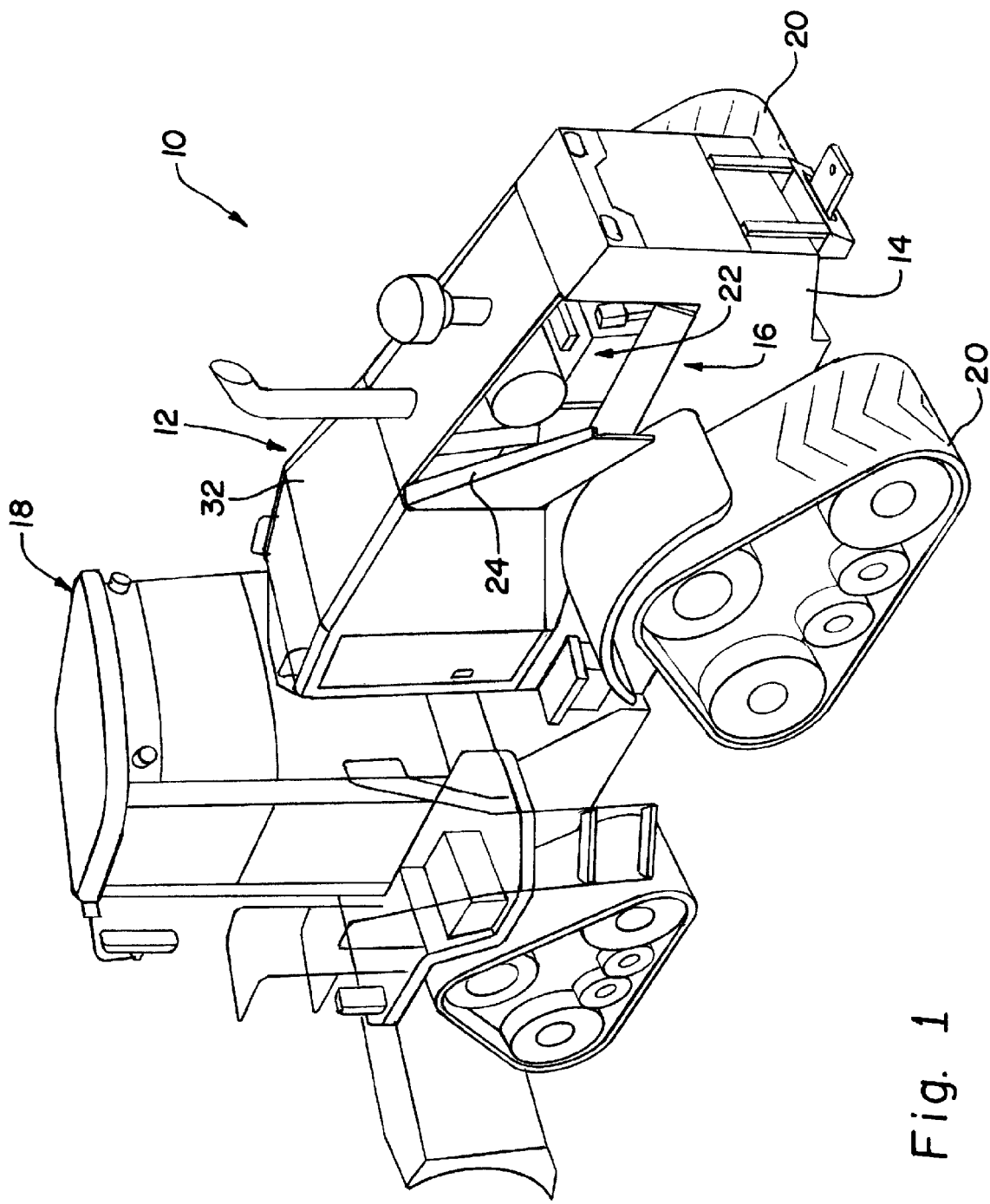
FIG. 1 is a perspective view of a work machine including an embodiment of a cooling package of the present invention.

Referring now to the drawings, and more particularly to FIG. 1, there is shown a perspective view of a work vehicle 10 with which an embodiment of a cooling package 12 of the present invention can be used. In the illustrated embodiment, work vehicle 10 is in the form of a high-speed dozer which is manufactured and sold by the assignee of the present invention. It is to be understood that work vehicle 10 may be in the form of a different type of vehicle, such as an agricultural tractor, backhoe, forestry harvester, truck, etc.

Work vehicle 10 includes a frame 14 which structurally carries a number of components, such as cooling package 12, engine compartment 16, operator cab 18, tracks 20, etc. Cooling package 12 is located adjacent to engine compartment 16 which houses an internal combustion (IC) engine 22 visible through access panel 24. IC engine 22 provides a source of power for work vehicle 10, and can be configured in known manner, such as a diesel engine, gasoline engine, hybrid engine, etc.

Figure 2:
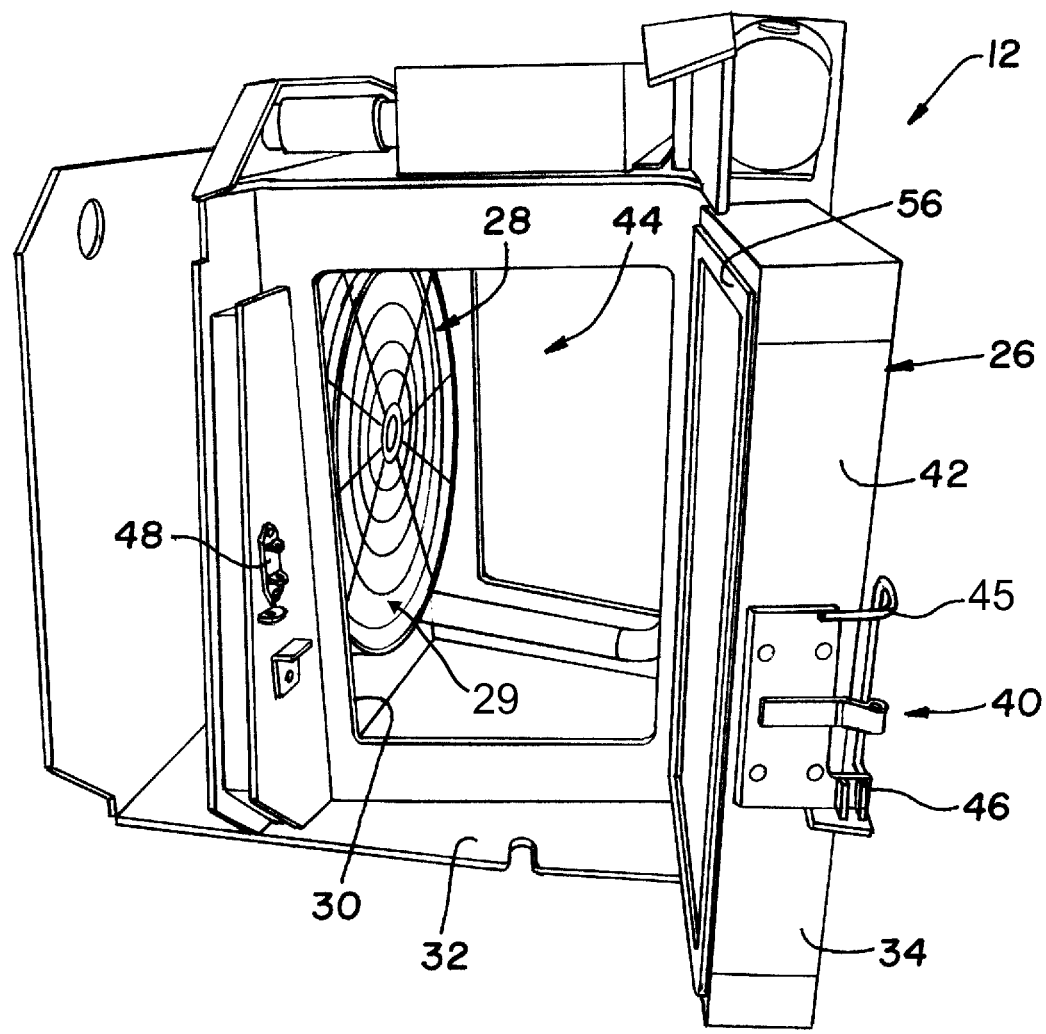
FIG. 2 is a perspective view of a cooling package for use on the work machine of FIG. 1, including an embodiment of a fluid cooler of the present invention.

Referring now to FIG. 2, cooling package 12 is a stand-alone cooling package which is used for cooling one or more fluids (liquid or gas) in work vehicle 10. For example, cooling package 12 can include a fluid cooler 26 in the form of a hydraulic oil cooler for cooling hydraulic oil, a radiator for cooling engine coolant (not shown), and aftercooler for cooling gases associated with a turbocharger system or an exhaust gas recirculation (EGR) system (not shown), etc. Cooling package 12 may also include a fan 28 for inducing a flow of cooling air through cooling package 12. Fan 28 is positioned within an opening 29 of housing 32 forming a part of cooling package 12.

Figure 3:
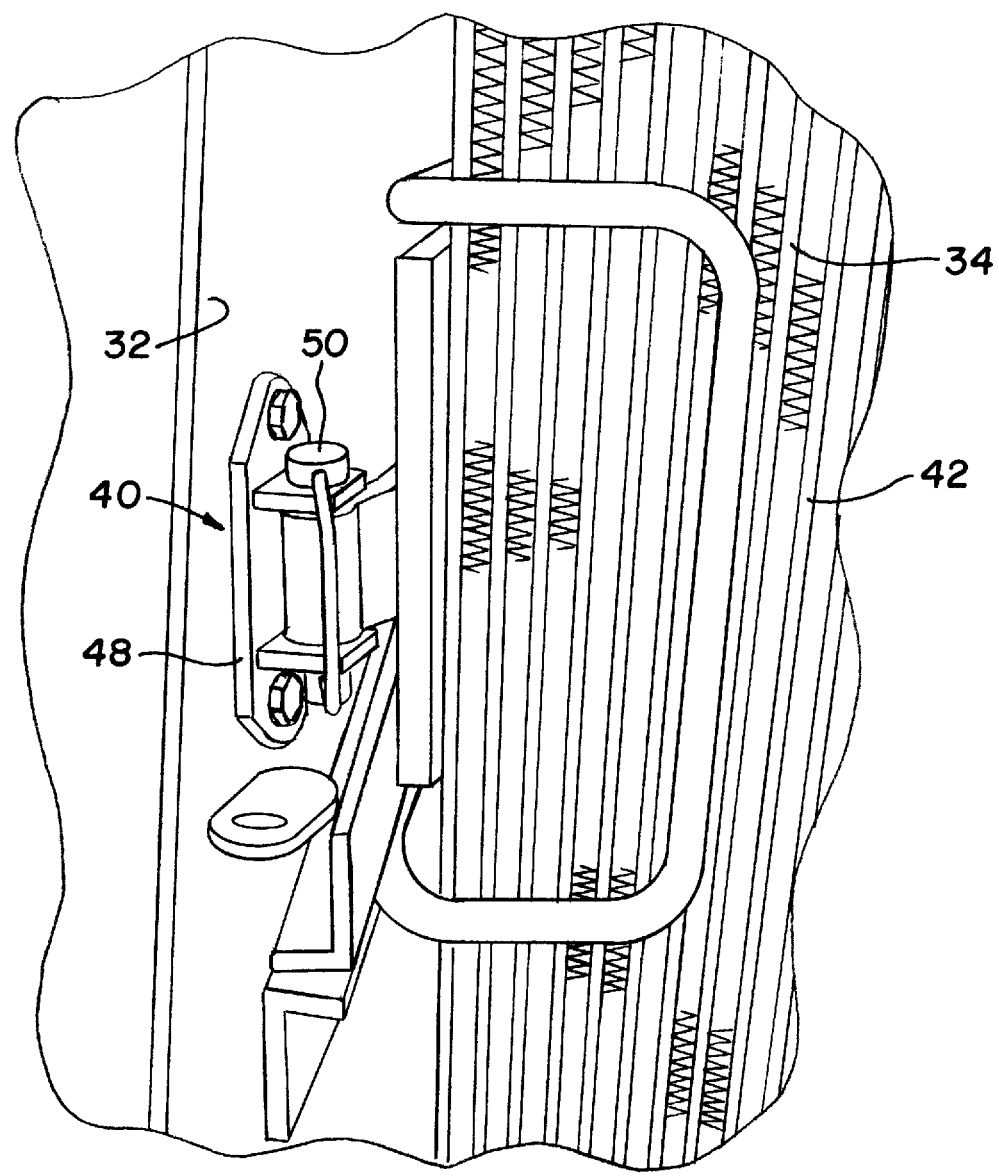
FIG. 3 is a perspective view of the latch shown on the fluid cooler of FIG. 2.

Fluid cooler 26 (FIGS. 2-4) covers an opening 30 of housing 32. Fluid cooler 26 includes a core 34 defining a fluid to air heat exchanger, in known manner. Moreover, fluid cooler 26 includes at least one hinge 36 connected to one side 38 thereof, and at least one latch 40 connected to another side 42 thereof, whereby fluid cooler 26 can be pivoted open to access an inner side thereof for servicing, cleaning, etc. In the illustrated embodiment, fluid cooler 26 includes a pair of hinges 36A and 36B, and a single latch 40 which is located on side 42 opposite from side 38. However, fluid cooler 26 may be differently configured. For example, fluid cooler 26 may include a single piano-type hinge along side 38 and a pair of latches 40 along a side 42 which is adjacent to or opposite from side 38.

Latch 40 may include a handle 45 allowing an operator to grasp and pivot fluid cooler 26 between the open and closed positions. When in the open position, and operator may also access an interior 44 of cooling package 12 for servicing or cleaning of other fluid coolers, pumps, fans, etc.

Latch 40 may also include a first flange 46 carried by fluid cooler 26 and a second flange 48 carried by housing 32. Each of first flange 46 and second flange 48 have respective holes (not specifically visible) which align with each other when fluid cooler 26 is in the closed position for receiving a pin 50, thereby latching fluid cooler 26 to housing 32.

Figure 4:
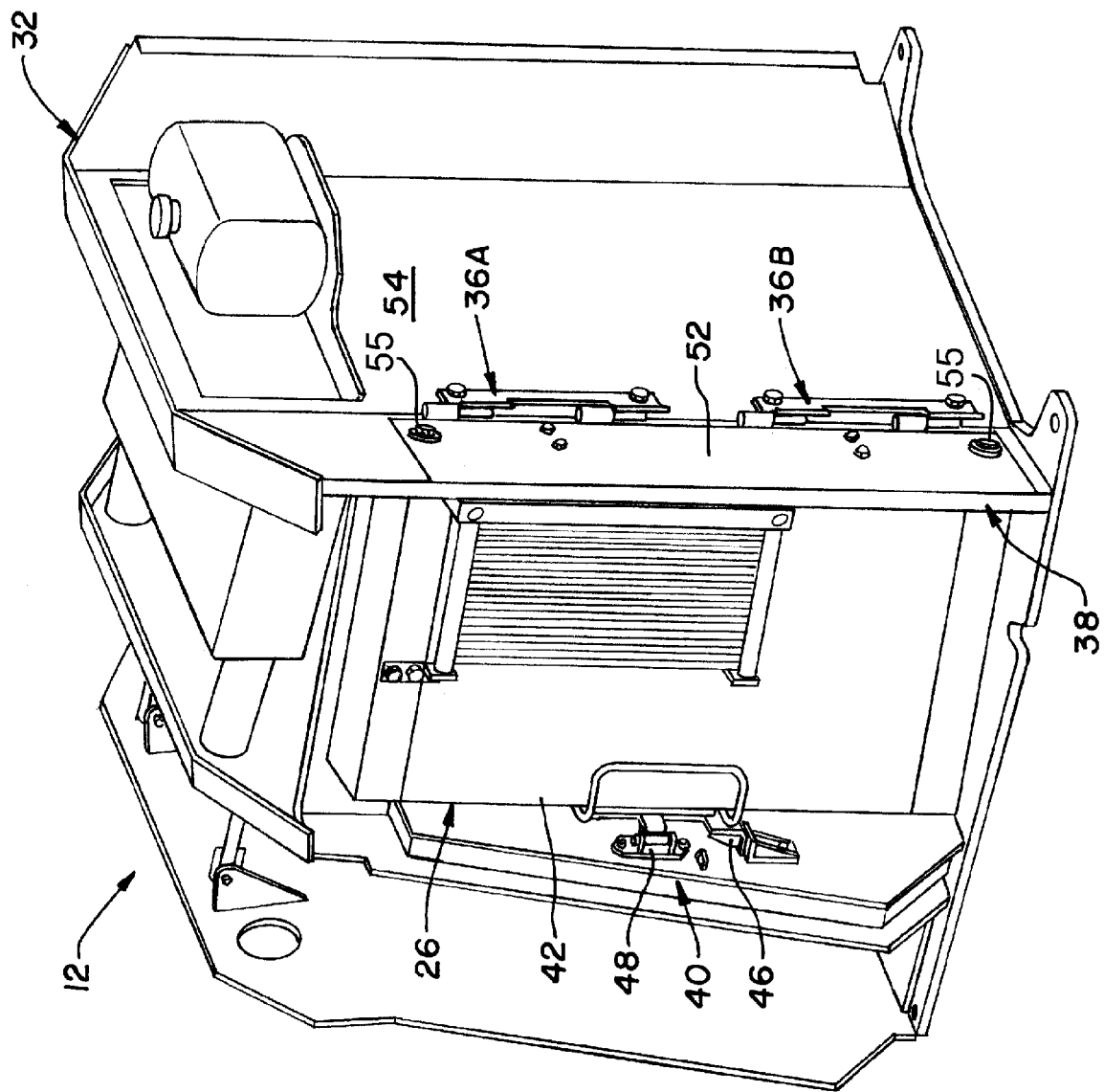
FIG. 4 is another perspective view of the cooling package shown in FIG. 2, with the hinges visible on the back side of the plate to which the cooler is attached.

Referring now to FIG. 4, it may be seen that fluid cooler 26 is indirectly connected to housing 32 by way of a pivotable plate 52. More specifically, each hinge 36A and 36B is hinged along the intersection line between plate 52 and an adjoining panel 54 of housing 32. Fluid cooler 26 is then directly attached to plate 52 using fasteners 55, or other suitable connection methods. It is also possible to directly attach each hinge 36A and 36B to a side of fluid cooler 26, rather than using an intervening plate 52.

Referring again to FIG. 2, fluid cooler 26 may also include an optional screen 56 at the inner side thereof (site adjacent to interior 44) for coarse filtering of air flowing through the core 34 of fluid cooler 26.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
    a frame;
    an internal combustion engine carried by said frame; and
    a cooling package associated with said internal combustion engine, said cooling package including a housing having an interior and an opening connected to said interior, and a fluid cooler covering said opening, said fluid cooler including at least one hinge connected to a first side thereof, at least one latch connected to a second side thereof, and a handle coupled to the fluid cooler and including a first end and a second end, whereby said fluid cooler pivots open about an axis of rotation to access said interior of said cooling package, and wherein the at least one latch is positioned axially intermediate the first and second ends of the handle.

2. The vehicle of claim 1, wherein said at least one hinge is a pair of hinges, and said at least one latch is a single latch.

3. The vehicle of claim 1, wherein said at least one latch includes a first flange carried by said fluid cooler and a second flange carried by said housing, each of said first flange and said second flange having respective holes which align with each other for receipt of a pin, when in a latched position.

4. The vehicle of claim 1, wherein said first side and said second side of said fluid cooler are generally opposite from each other.

5. The vehicle of claim 1, wherein said fluid cooler includes a screen at an inner side for coarse filtering of air.

6. The vehicle of claim 1, wherein the handle is coupled to said second side.

7. The vehicle of claim 1, wherein said housing includes another opening with a fan located in said interior and associated with said other opening for inducing a flow of air through said fluid cooler, said fan being accessible when said fluid cooler is pivoted open.

8. The vehicle of claim 1, wherein said fluid cooler is a hydraulic oil cooler.

9. The vehicle of claim 1, wherein said vehicle is a work vehicle.

10. A work vehicle, comprising:
    a frame; and
    a cooling package carried by said frame, said cooling package including a housing having an interior and an opening connected to said interior, and a fluid cooler covering said opening, said fluid cooler including at least one hinge connected to a first side thereof, at least one latch connected to a second side thereof, and a handle extending along a third side of the fluid cooler that extends between the first and second sides, whereby said fluid cooler pivots open to access said interior of said cooling package.

11. The work vehicle of claim 10, wherein said cooling package is carried directly by said frame.

12. The work vehicle of claim 10, wherein said at least one hinge is a pair of hinges, and said at least one latch is a single latch.

13. The work vehicle of claim 10, wherein said at least one latch includes a first flange carried by said fluid cooler and a second flange carried by said housing, each of said first flange and said second flange having respective holes which align with each other for receipt of a pin, when in a latched position.

14. The work vehicle of claim 10, wherein said first side and said second side of said fluid cooler are generally opposite from each other.

15. The work vehicle of claim 10, wherein said fluid cooler includes a screen at an inner side for coarse filtering of air.

16. The work vehicle of claim 10, wherein the handle is coupled to the second side of the fluid cooler.

17. The work vehicle of claim 10, wherein said housing includes another opening with a fan located in said interior and associated with said other opening for inducing a flow of air through said fluid cooler, said fan being accessible when said fluid cooler is pivoted open.

18. The work vehicle of claim 10, wherein said at least one hinge is directly connected to a plate, and indirectly connected to said first side of said fluid cooler via said plate.

19. The work vehicle of claim 10, wherein said fluid cooler is a hydraulic oil cooler.

20. A stand-alone cooling package for cooling a fluid used in a work vehicle, said cooling package comprising:
    a housing having an interior and an opening connected to said interior; and
    a fluid cooler covering said opening, said fluid cooler including at least one hinge connected to a first side thereof, and a mounting plate coupled to a second side thereof, at least one latch being supported by the mounting plate and a handle of the fluid cooler being supported by the mounting plate, whereby said fluid cooler pivots open to access said interior of said cooling package, and a maximum length of the mounting plate being substantially less than a maximum length of the fluid cooler.

21. The cooling package of claim 20, wherein said at least one hinge is a pair of hinges, and said at least one latch is a single latch.

22. The cooling package of claim 20, wherein said at least one latch includes a first flange carried by said fluid cooler and a second flange carried by said mounting plate, each of said first flange and said second flange having respective holes which align with each other for receipt of a pin, when in a latched position.

23. The cooling package of claim 20, wherein said first side and said second side of said fluid cooler are generally opposite from each other.

24. The cooling package of claim 20, wherein said fluid cooler includes a screen at an inner side for coarse filtering of air.

25. The cooling package of claim 20, wherein said at least one latch and said handle are coupled to the second side of the fluid cooler through the mounting plate.

26. The cooling package of claim 20, wherein said housing includes another opening with a fan located in said interior and associated with said other opening for inducing a flow of air through said fluid cooler, said fan being accessible when said fluid cooler is pivoted open.

27. The cooling package of claim 20, wherein said at least one hinge is directly connected to a plate, and indirectly connected to said first side of said fluid cooler via said plate.

28. The cooling package of claim 20, wherein said fluid cooler is a hydraulic oil cooler.

29. The vehicle of claim 1, wherein the first and second ends of the handle are coupled to the second side of the fluid cooler.

30. The work vehicle of claim 10, wherein the third side defines an outer side of the fluid cooler.

31. The work vehicle of claim 10, wherein the first and third sides of the fluid cooler cooperate with each other to define a corner, and the handle wraps around the corner.

32. The cooling package of claim 22, wherein the handle includes a first end and a second end, and the first flange is positioned intermediate the first and second ends.

* * * * *